United States Patent [19]

Nagai et al.

[11] Patent Number: 5,566,718
[45] Date of Patent: Oct. 22, 1996

[54] FLUID PRESSURE DEVICE

[75] Inventors: Shigekazu Nagai; Hiroshi Matsushima; Yoshiharu Ito; Akio Saitoh, all of Ibaraki-ken, Japan

[73] Assignee: SMC Kabushiki Kaisha, Tokyo, Japan

[21] Appl. No.: 453,826

[22] Filed: May 30, 1995

Related U.S. Application Data

[63] Continuation of Ser. No. 193,060, filed as PCT/JP92/01147, Sep. 9, 1992, abandoned.

[30] Foreign Application Priority Data

Sep. 10, 1991 [JP] Japan ................................. 3-258388
Sep. 10, 1991 [JP] Japan ................................. 3-258389

[51] Int. Cl.$^6$ ............................................. F16K 11/00
[52] U.S. Cl. ..................... 137/884; 137/560; 285/137.1; 294/64.1
[58] Field of Search ............................ 137/884, 560, 137/614.03, 614.04; 285/137.1; 294/64.1, 64.2, 65; 417/187, 188

[56] References Cited

U.S. PATENT DOCUMENTS

| | | | |
|---|---|---|---|
| 4,486,060 | 12/1984 | Currall | 137/560 X |
| 4,815,496 | 3/1989 | Nishitani et al. | 137/560 X |
| 4,896,700 | 1/1990 | Stoll | 137/884 |
| 4,938,258 | 7/1990 | Sato | 137/560 X |
| 5,048,569 | 9/1991 | Stoll et al. | 137/884 X |

FOREIGN PATENT DOCUMENTS

| | | | |
|---|---|---|---|
| 0203780 | 8/1989 | Japan | 137/884 |
| 2-144699 | 2/1990 | Japan. | |
| 3-13663 | 3/1991 | Japan. | |
| 405018472 | 1/1993 | Japan | 137/884 |

*Primary Examiner*—John C. Fox
*Attorney, Agent, or Firm*—Oblon, Spivak, McClelland, Maier & Neustadt, P.C.

[57] ABSTRACT

A fluid pressure device having a fluid unit suitable for use as a vacuum generating unit formed by connecting together a plurality of blocks having different functions, the fluid unit being connected to an external device. The fluid pressure device includes a plug-in/one-touch type electric signal connecting unit for collectively mounting a plurality of terminals in a wall surface of the fluid unit, to electrically connect the plurality of blocks to the external device. The terminals are connected to the external device by a single multi-connector means, and a plug-in/one-touch type fluid passage connecting unit, for collectively providing connecting portions within the wall surface of the fluid unit, to interconnect the external device and fluid passages defined in the fluid unit. The fluid passages are connected to the external device by a plurality of cylindrical insertion members which are inserted into the connecting portions.

15 Claims, 11 Drawing Sheets

FLUID PRESSURE DEVICE

This application is a Continuation of application Ser. No. 08/193,060, filed on Mar. 8, 1994, now abandoned which was filed as PCT application PCT/JP92/01147 on Sep. 9, 1992.

TECHNICAL FIELD

The present invention relates to a fluid pressure device wherein a plurality of blocks having different functions are combined into a single unit.

BACKGROUND ART

A fluid pressure device such as a vacuum generating unit is constructed by connecting together a plurality of blocks having different functions, and which are provided respectively with peripheral devices such as a feed valve for supplying either vacuum or compressed air, a vacuum break valve, an attraction confirmation switch serving as a vacuum detecting means, a timer, a display, etc. Further, electrical mechanisms are electrically connected to a control device such as a sequencer or the like by signal conductors or wires, such as discrete lead wires or the like, to thereby transfer control signals therebetween.

A vacuum generating unit according to the prior art is shown in FIG. 1. FIG. 1 shows a structure for connecting signal wires between a vacuum generating device 2 and a sequencer 4 which serves as an external device, in which ejectors respectively having different vacuum attracting or sucking conditions are set as vacuum generating sources. The vacuum generating unit 6a is constructed by connecting peripheral devices such as a compressed-air feed valve 12a, a vacuum break valve 14a, an attraction confirmation switch 16a, etc. to a block 10a having an ejector provided thereinside and a vacuum port 8a. The vacuum generating unit 6a, and other vacuum generating units formed in a manner similar to the vacuum generating unit 6a, are placed on a manifold 18 to thereby form the vacuum gene rating device 2. Compressed air is supplied from an unillustrated compressed-air feed source to the vacuum generating units 6a through 6e through a compressed-air feed port 20, so that negative pressures are generated by the ejectors respectively. In the vacuum generating units 6c through 6e, for example, negative pressures are supplied respectively from vacuum ports 8c through 8e to corresponding suction pads 24c through 24e through vacuum tubes 22c through 22e. Thus, the suction pads 24c through 24e attract and feed workpieces 26c through 26e.

The sequencer 4 has input keys 28 and a display unit 30 comprised of an LCD, both provided on an upper surface thereof. Further, the sequencer 4 has signal terminals 32 respectively connected to objects to be controlled The peripheral devices of the vacuum generating units 6a through 6e provided on the manifold 18 are separately connected to the signal terminals 32 of the sequencer 4 by a plurality of signal conductors or wires 34.

The vacuum generating device 2 is electrically connected to the sequencer 4 used as an external device by a plurality of signal wires 34 as described above. The compressed-air feed port 20 and the vacuum ports 8a through 8e are firmly connected to the peripheral devices through vacuum tubes 22a through 22e, so as to withstand the pressure of compressed air and the negative pressure. Further, the compressed-air feed port 20 and the vacuum ports 8a through 8e serve to keep the device airtight.

Thus, when it is desired to change the performance or functions of the vacuum generating device 2 according to a desired purpose at a job site, or to entirely replace one or more of the vacuum generating units 6a through 6e due to a sudden malfunction or the like at the job site, it becomes cumbersome to make such changes and much time is wasted. Particularly, an inconvenience is developed in that the procedure for releasing and re-connecting the plurality of signal wires 34 and the vacuum tubes 22a through 22e is cumbersome and requires a lot of time, and mistakes such as a misconnection of signal wires, etc. can arise.

Further, when the units are rearranged or replaced, the pressurized-fluid passage which communicates with the entire vacuum generating device 2 is opened thereby discharging pressurized fluid to the outside and drawing air into the passage. Therefore, the replacement or rearrangement work can only be performed after the process of attracting and feeding of a workpiece by the vacuum generating device 2 has been completely discontinued. Accordingly, work efficiency is greatly reduced.

Moreover, when the units are recombined, dust or the like enters into the vacuum generating device 2 due to the suction of air from the vacuum passage, so that a reduction in performance occurs since the airtightness of the device is lowered after such recombining work has been carried out.

On the other hand, the sequencer 4 manages or controls all of the signal wires 34 for the peripheral devices making up the vacuum generating units 6a through 6e, and internally controls the timing for each of the peripheral devices.

Thus, the number of the signal wires 34 electrically connected between the peripheral devices of the vacuum generating units 6a through 6e and the sequencer 4 greatly increases. Hence, it is cumbersome to provide wiring for the signal wires 34, miswiring tends to occur. Further, the peripheral devices can experience malfunctions due to noise or the like generated between the signal wires 34. Such an inconvenience is also common even with other vacuum units connected to the sequencer by a plurality of signal wires, as well as to the vacuum generating units.

It is therefore an object of the present invention to provide a fluid pressure device capable of easily carrying out, at a job site, either the rearrangement of the fluid pressure device according to desired functions and performance thereof, and to facilitate the replacement of the fluid pressure device when sudden malfunctions or accidents occur, without discontinuing the general operation of a working line using the fluid pressure device, and further avoiding a reduction in performance of the fluid pressure device after either its rearrangement or replacement has been performed.

It is another object of the present invention to provide a fluid pressure device wherein complicated wiring, occurrence of miswiring, and malfunctions of the fluid pressure device due to noise can be avoided, by simplifying signal wires using an interface block and a serial transmitting means, and wherein the structure of the fluid pressure device can be reduced in size and weight, so as to improve its general-purpose properties.

DISCLOSURE OF THE INVENTION

A plurality of blocks which form a fluid pressure unit have different functions from each other, and are electrically connected to an external device. A plurality of terminals are collectively provided within a wall surface of the fluid pressure device, and are electrically connected to the external device via a plug-in/one-touch system using a single multi-connector means. Therefore, the present invention can rapidly and easily provide electrical connections and avoid the occurrence of miswiring.

Further, when the fluid pressure unit and the external device are interconnected via fluid passages defined in the fluid pressure unit, a plug-in/one-touch fluid passage connecting means is used. This arrangement allows a plurality of cylindrical members to be inserted into corresponding connecting portions of the fluid passage connecting means, which collectively are disposed in the wall surface of the fluid pressure unit. It is therefore possible to rapidly and easily interconnect the fluid passages.

BEST MODE FOR CARRYING OUT THE INVENTION

Fluid pressure devices according to the present invention will hereinafter be described in detail with reference to the accompanying drawings in which preferred embodiments are shown by way of illustrative example. Incidentally, vacuum pressure devices are all described in the following embodiments. However, the present invention is not necessarily limited to a vacuum pressure device and can also be applied to other types of fluid pressure devices.

Figure 1:
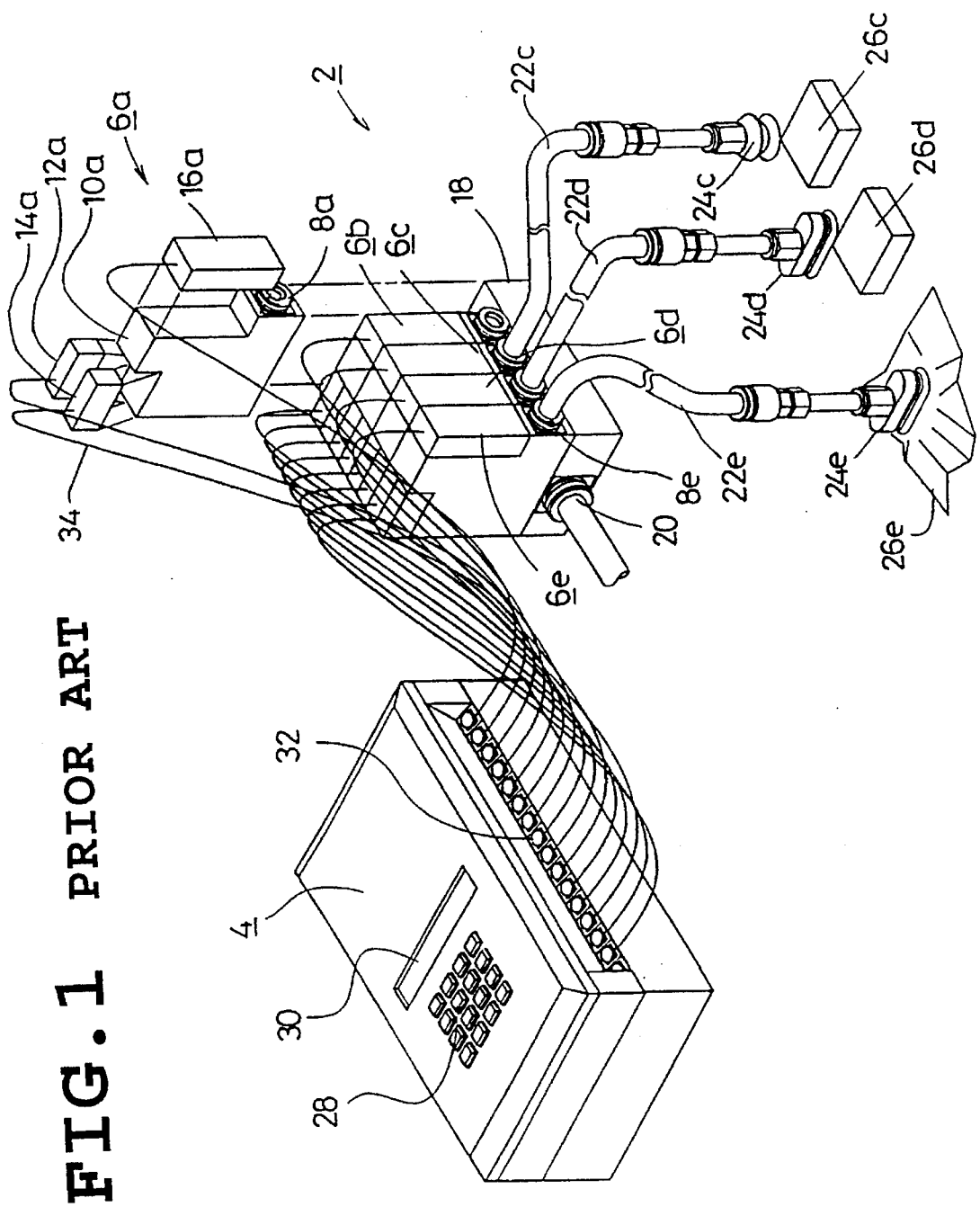
FIG. 1 is a perspective view showing an attracting and feeding system according to the prior art.
Figure 2:
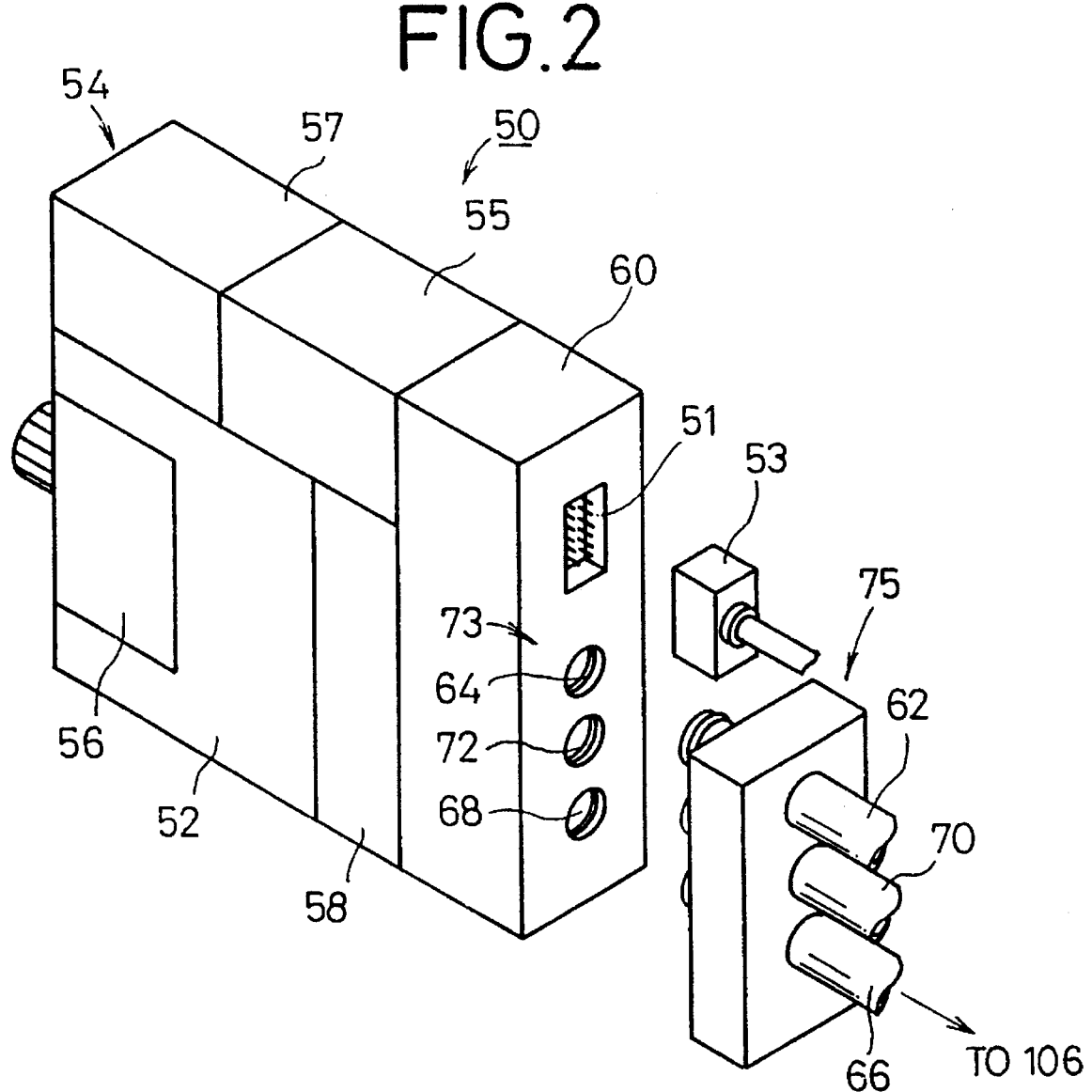
FIG. 2 is a perspective view illustrating a first embodiment of a fluid pressure device according to the present invention.

In FIG. 2, reference numeral 50 indicates a vacuum unit made up of a plurality of blocks having respective portions which provide predetermined functions. The vacuum unit 50 basically comprises a valve block 52, a pilot-operated electromagnetic valve block 54, a filter block 56, an ejector block 58 and a sensor block 60.

The vacuum unit 50 has a first connecting portion 73 provided within a same wall surface thereof. The connecting portion 73 comprises a compressed-air feed port 64 corresponding to a hole for supplying or feeding compressed air fed from an unillustrated compressed-air feed source via a tube 62, a vacuum port 68 corresponding to a connecting portion for delivering a vacuum suction force produced by the ejector block 58 to an external member, such as a suction pad or the like, through a vacuum tube 66, and an exhaust or discharge port 72 for discharging compressed air which has passed through the ejector block 58 through a tube 70. The vacuum tube 66 and the tube 70 make up a second connecting portion 75 which is formed as a single unit. In this case, the connection between the second connecting portion 75 and the first connecting portion 73 is rapidly and easily performed by a plug-in/one-touch system. After completion of the connection, the second connecting portion 75 and the first connecting portion 73 are held by claw-shaped members, or the like, provided on either side of the first and second connecting portions.

Further, a compressed-air feed valve corresponding to a selector or directional control valve for supplying and cutting off compressed air to the ejector block 58, and a vacuum break valve for rapidly releasing the vacuum port 68 from a state of vacuum, are disposed within the valve block 52.

The pilot-operated electromagnetic valve block 54 comprises pilot-operated electromagnetic valves 55 and 57 mounted to an upper portion of the valve block 52, which are used respectively to actuate the compressed-air feed valve and the vacuum break valve. A sensor block 60 for detecting a state of pressure in an ejector is mounted to a side portion of the valve block 52, with the ejector block 58 interposed therebetween.

In order to suitably drive the sensor block 60, as well as the pilot-operated electromagnetic valves 55 and 57, electrical wires extending from the respective blocks are provided inside the vacuum unit 50, and are connected to an external device such as a sequencer 74 or the like corresponding to a controlling means. Further, terminals for the electrical wires are collectively disposed in the same wall surface of the vacuum unit 50 as a terminal unit 51. The terminal unit 51 is rapidly and easily electrically-connected to the external device by a single plug-in/one-touch multi-connector means 53.

Further, when it is desired to change the capability, performance and/or functions of the vacuum device comprised of a plurality of vacuum units according to a desired purpose at a job site, or when one attempts to replace one or more of the vacuum units due to an unexpected trouble or the like on-site, a pressurized fluid passage, which communicates with the entirety of the vacuum device due to the separation of a vacuum unit from the vacuum device, is opened to cause pressurized fluid to flow outside and to suck or draw outside air into the passage. It is thus possible to avoid the complete stoppage of general operations on a working line using the vacuum device. In order to avoid a reduction in operating performance such as deterioration in airtightness, which can result from the entry of dust or the like into the vacuum device due to the suction of air through the passage, which is kept under vacuum after the unit replacing process has been completed, an unillustrated check valve is disposed at a position immediately before a position where the compressed-air feed port 64, the vacuum port 68 and the discharge port 72 are connected to one another.

Figure 3:
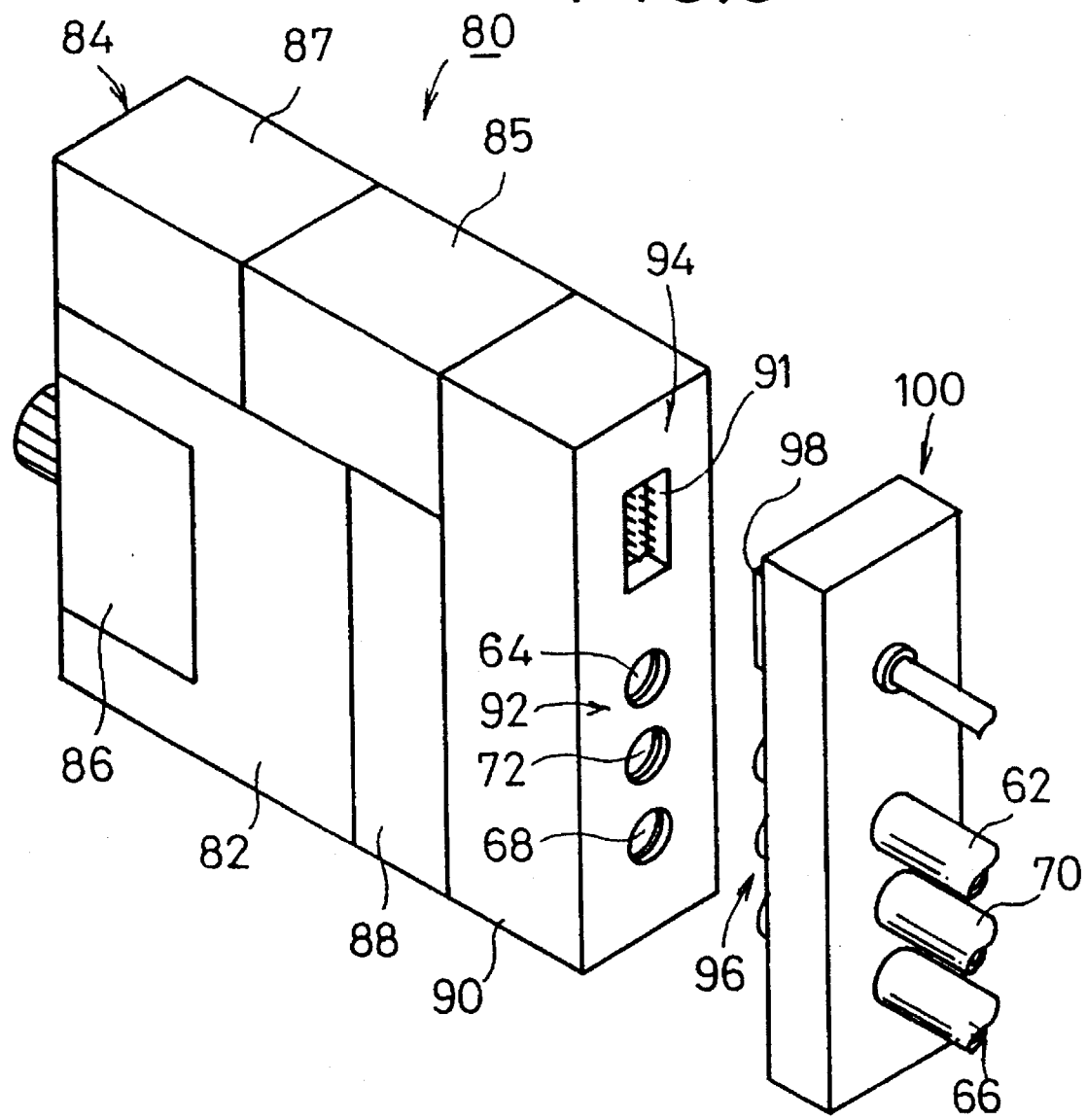
FIG. 3 is a perspective view showing a second embodiment of a fluid pressure device according to the present invention.

FIG. 3 shows a second embodiment of the invention different from the above embodiment. In FIG. 3, reference numeral 80 indicates a vacuum unit made up of a plurality of blocks. The vacuum unit 80 basically comprises a valve block 82, a pilot-operated electromagnetic valve block 84, a filter block 86, an ejector block 88 and a sensor block 90, disposed in a manner similar to the vacuum unit 50 of the first embodiment. The vacuum unit 80 is different from the vacuum unit 50, however, in that a connecting means is used which comprises a complex female-type connecting portion 94 formed integrally by a terminal unit 91 of a first connecting portion 92, and wherein a compressed-air feed port 64, a vacuum port 68 and an exhaust or discharge port 72 of the first connecting portion 92 are disposed at a region along the same wall surface, and are substantially adjacent to each other. The connecting means further comprises a complex male-type connecting portion 100 formed integrally by a second connecting portion 96 comprising a tube 62, a vacuum tube 66, a tube 70 and a multi-connector means 98, so that the electrical connections and the communication or connection between fluid passages can be performed simultaneously.

An attracting and feeding system 104, including a plurality of vacuum units 50 as shown in FIG. 2 which are connected to each other side by side by a manifold 102, will next be described with reference to FIG. 4.

Figure 4:
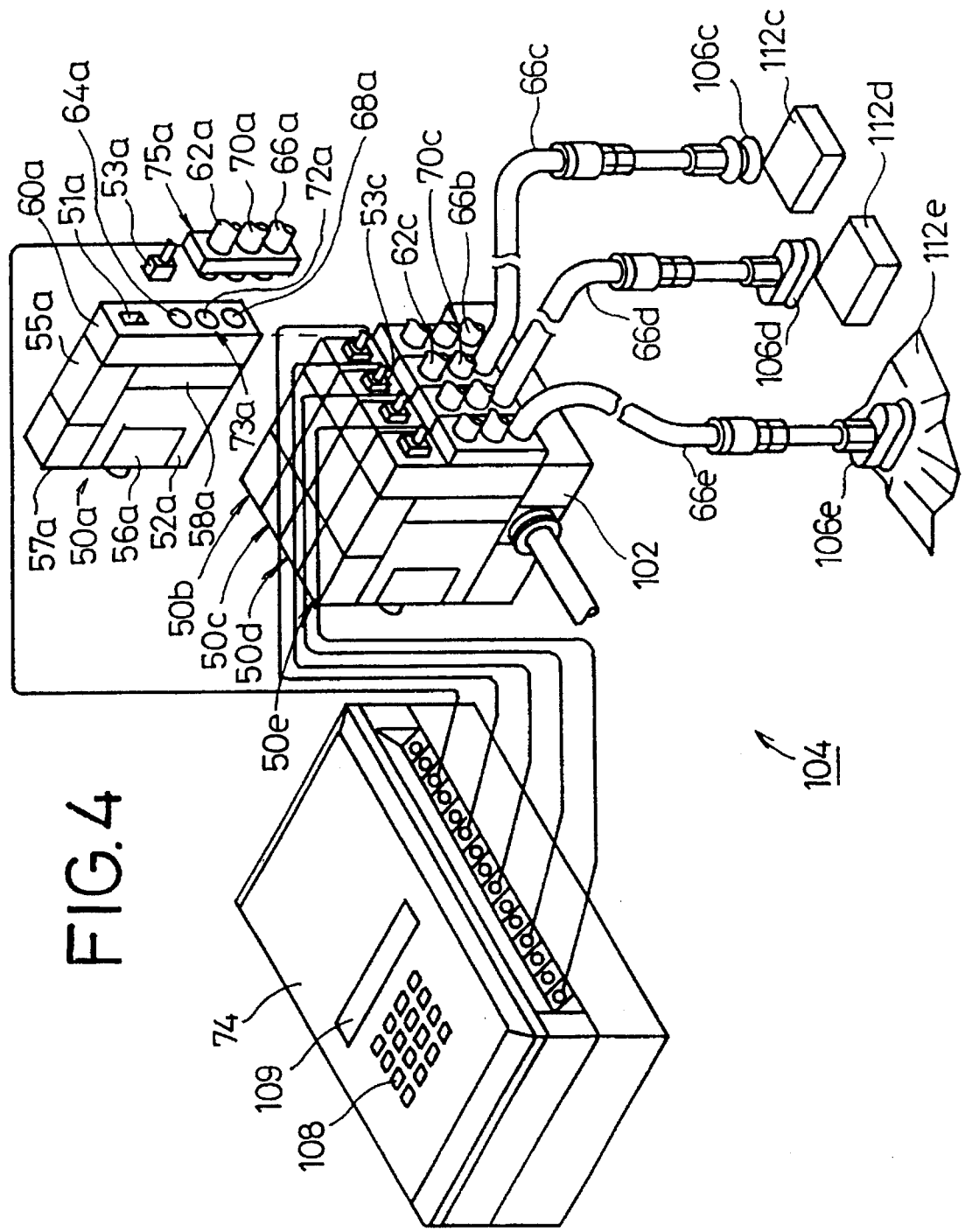
FIG. 4 is a perspective view depicting an attracting and feeding system in which the fluid pressure device according to the present invention is employed.

The attracting and feeding system 104 shown in FIG. 4 is constructed by vacuum units 50a through 50e which are mounted on the manifold 102, along with vacuum generating sources comprising ejectors having different vacuum attracting or sucking functions. Second connecting portions 75a through 75e are coupled to corresponding first connecting portions 73a through 73e respectively attached to the vacuum units 50a through 50e.

The following first through third connections can easily be made at any time due to the above structure: The first connection is a coupling between tubes 62a through 62e and their corresponding compressed-air feed ports 64a through 64e, to feed or supply compressed air from an unillustrated compressed-air feed source via the tubes 62a through 62e. The second connection is a connection made between suction pads 106a through 106e and their corresponding vacuum ports 68a through 68e via vacuum tubes 66a through 66e, to transfer vacuum suction forces generated by the ejector blocks 58 to the corresponding suction pads 106. Finally, the third connection is a connection made between exhaust or discharge ports 72a through 72e for discharging compressed air which has passed through the ejector blocks 58a through 58e via tubes 70a through 70e and corresponding tubes 70a through 70e.

Electrical connections between the vacuum units 50a through 50e and a control means comprising a sequencer 74 are made by bus lines via terminal units 51a through 51e, which are respectively comprised of terminal portions having a plurality of terminals collectively provided in a same wall surface of the vacuum units 50a through 50e. Input keys 108, and a display unit 109 comprised of an LCD, are provided on an upper surface of the sequencer 74.

Since the respective vacuum units 50a through 50e are substantially identical in structure, the operations of the vacuum units will be described below by reference to only use vacuum unit 50c, and descriptions of the other vacuum units will therefore be omitted. Further, since the vacuum unit 50 shown in FIG. 2 and the vacuum unit 50c shown in FIG. 4 are substantially identical in structure to each other, the components of the vacuum unit 50 are indicated by small alphabetical characters and such components will not be described in detail.

When a work 112c is fed by the sucking and feeding system 104, an operation signal outputted from the sequencer 74 is first inputted to a pilot-operated electromagnetic feed valve 55c to thereby sequentially operate and thereby open a compressed-air feed valve provided inside the valve block 52c. As a result, compressed air is supplied to the ejector provided inside the ejector block 58c to generate a vacuum or negative pressure which is supplied to the suction pad 106c through the vacuum port 68c. When the work 112c is attracted and held by the suction pad 106c supplied with the vacuum, the vacuum in the vacuum unit is further raised. A pressure sensor disposed inside the sensor block 60c detects that the vacuum has exceeded a pressure which has been set in the sensor block 60c in advance, and thus the sensor block 60c sends an attraction confirmation signal to the sequencer 74.

When the attraction confirmation signal is received by the sequencer 74, and after an elapse of a fixed time interval set by a timer, the sequencer 74 confirms the completion of movement of the work 112c. Thereafter, the sequencer 74 transmits a stop signal to the compressed-air feed valve through a same or similar path as used for the supply of the operation signal, to thereby close the compressed-air feed valve and stop the generation of the vacuum from the ejector.

Simultaneously, the sequencer 74 sends an operation signal to a pilot-operated electromagnetic vacuum break valve 57c to thereby actuate and sequentially operate the pilot-operated electromagnetic valve 57c to open the valve. Thus, compressed air is supplied to the suction pad 106c through the vacuum port 68c, to thereby release the work 112c from the suction pad 106c.

Further, the sequencer 74 sends a stop signal to the pilot-operated electromagnetic valve 57c after a fixed time interval set by the timer provided inside the sequencer 74 has elapsed, thereby closing the vacuum break valve so as to complete the attracting and feeding operation.

The following provisions are available in the event that deterioration in performance, function or the like is developed in the vacuum unit 50c, for example, due to a cause occurring during the above series of attracting and feeding operations. Specifically, a check valve (not shown) is provided at a portion immediately before a portion where the compressed-air feed port 64c, the vacuum port 68c and the discharge port 72c are connected to one another. Accordingly, the passage for pressurized fluid, which communicates with the other units, is closed by the check valve (not shown), even if the connection between the first connecting portion 73c and a second connecting portion 75c is released to replace the vacuum unit 50c. Thus, pressurized fluid is prevented from being discharged outside, and outside air is prevented from being sucked or drawn into the passage. It is therefore possible to avoid a complete stoppage of general operations on a working line by the other vacuum units 50a, 50b, 50d and 50e. Further, the entry of dust or the like into the vacuum device, due to suction of outside air through the passage, is likewise prevented. It is thus possible to prevent a reduction in operating capability or performance, such as deterioration in airtightness, after the unit replacing process has been completed.

Figure 5:
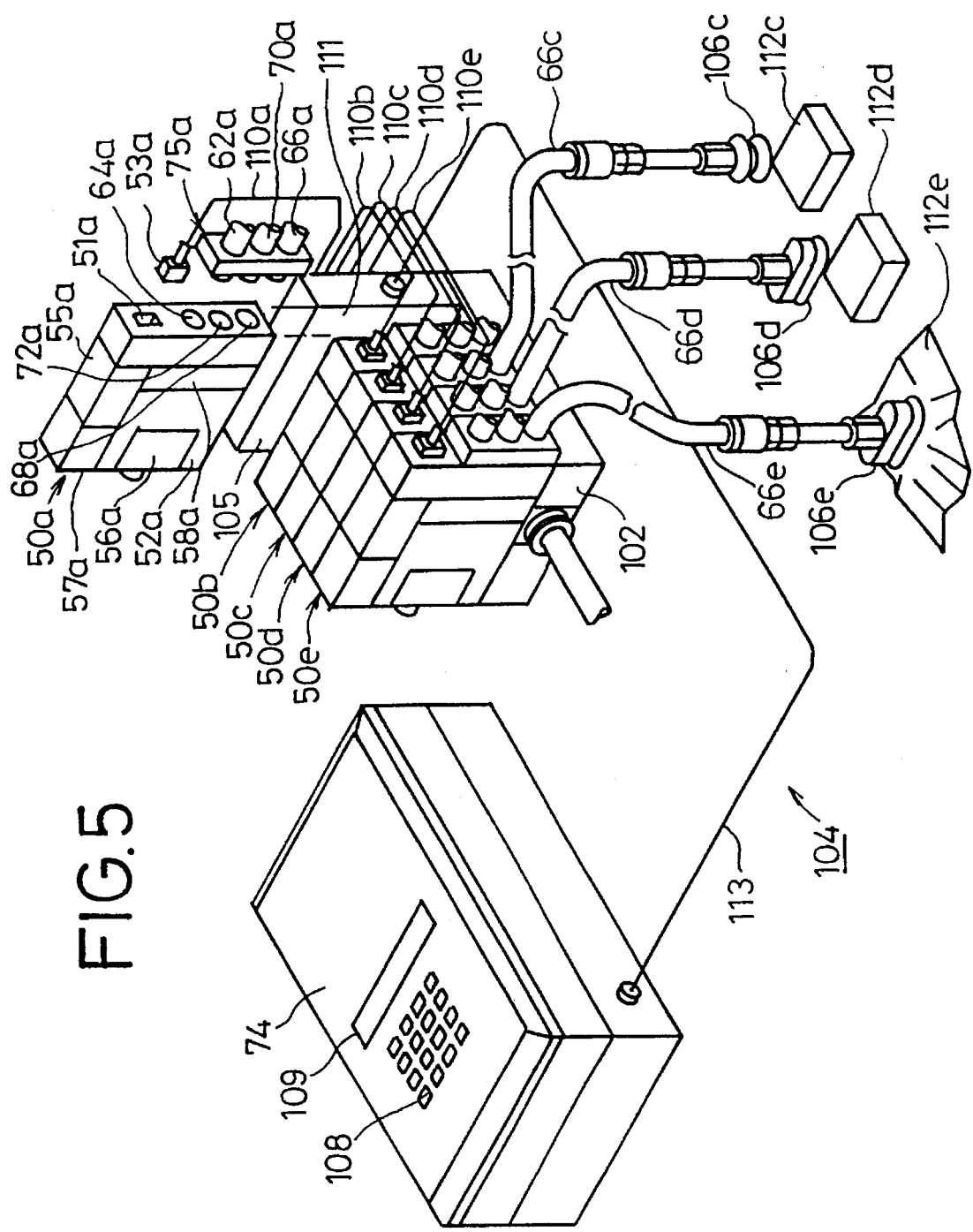
FIG. 5 is a perspective view illustrating an attracting and feeding system in which the fluid pressure device having a controller, according to the present invention, is employed.

FIG. 5 shows an attracting and feeding system 104 wherein a controller 105 for generally controlling the attracting and feeding system 104 and for converting a serial signal into a parallel signal, or vice versa, is mounted on a plurality of vacuum units 50a through 50e provided on a manifold 102, and in which ejectors respectively having different vacuum pressure conditions are used as vacuum sources.

The attracting and feeding system 104 includes multiconnector means 53a through 53e coupled to corresponding terminal units 51a through 51e, and respectively provided on the same wall surfaces as the vacuum units 50a through 50e. Further, the vacuum units 50a through 50e are electrically connected to the controller 105 via signal wires 110a through 110e, such as bus lines or the like, connected to the multi-connector means 53a through 53e. Therefore, parallel signals can be transferred between the vacuum units 50a through 50e and the controller 55.

As an alternative to the use or individual wires, the transfer of parallel signals may be performed using serial signals, a network communicating means such as a LAN or the like, a wireless means using microwaves, an optical communicating means, an optical fiber, etc.

Incidentally, a high-speed network protocol can be used as the protocol for transferring the signals.

As the signal transmission-line connecting means between the vacuum units 50a through 50e, a direct connector-to-connector coupling may be performed without using individual wires. Alternatively, the vacuum units 50a through 50e may be coupled by employing bus module blocks having connectors different from those described above, or by using flat cables. More specifically, the connectors may be constructed similar to the terminal unit 91 shown in FIG. 3. Alternatively, the connectors may be formed on side surfaces, or upper surfaces, and the positions of the connectors may be determined in a manner to facilitate connection with one another.

The parallel signals which are inputted to the controller 105 via a plurality of terminals are converted into a group of serial signals, which are in turn serially-transmitted to the sequencer 74 via a single wire 113 for transmitting the serial signals from a single terminal 111.

A vacuum unit according to a third embodiment of the present invention will next be described below in detail with reference to the accompanying drawings.

Figure 6:
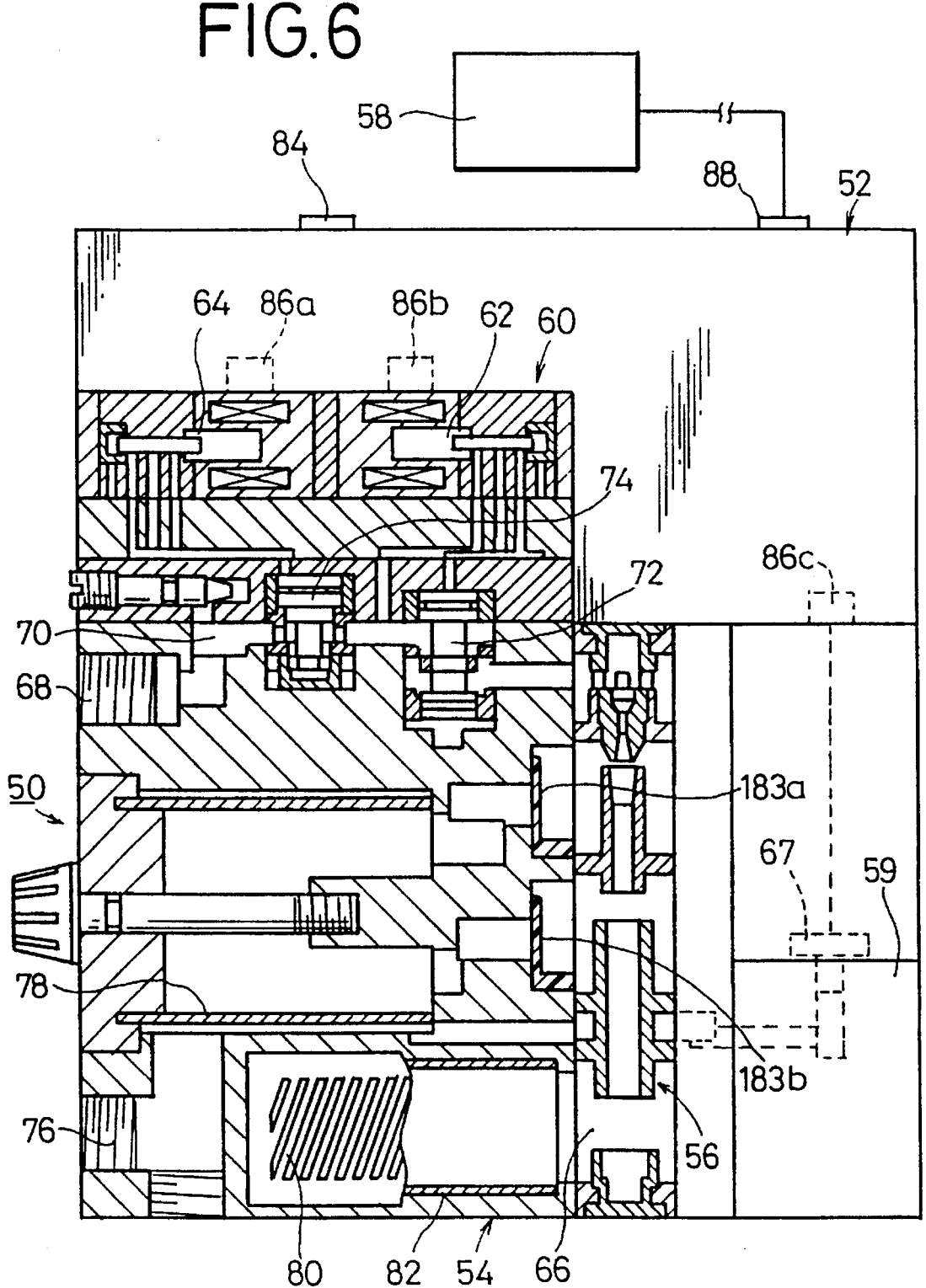
FIG. 6 is a partial cross-sectional view showing a third embodiment of a fluid pressure device according to the present invention.

In FIG. 6, reference numeral 150 indicates a vacuum unit according to the third embodiment. The vacuum unit 150 substantially comprises a vacuum generating unit 154 indicated by oblique lines, and an interface block 152 for connecting the vacuum generating unit 154 to an external device such as a sequencer 158 or the like.

The vacuum generating unit 154 basically comprises a body 156, a pressure sensing section 159 for sensing a state of pressure of an ejector 66 (to be described later) using a pressure sensor 167, and a valve section 160 comprised of an electromagnetic or solenoid-controlled compressed air feed valve 162, and an electromagnetic or solenoid-controlled vacuum break valve 164.

A compressed-air feed port 168 for supplying compressed air to the ejector 166, which serves as a vacuum generating source, is defined in a side wall of the body 156 of the vacuum generating unit 154. A compressed-air feed valve (check valve) 172 for supplying and cutting off the supply of compressed air, and a vacuum break valve 174 for releasing a state of vacuum from a vacuum port 176 are provided in the course of a compressed-air feed passage 170, for causing the compressed-air feed port 168 to communicate with the ejector 166. The vacuum port 176, which communicates with the ejector 166, is defined in a same side wall as that used for the compressed-air feed port 168. Further, a filter 178 for removing dust, moisture or water, or the like, from the evacuated air is interposed between the vacuum port 176 and the ejector 166. A compressed-air exhaust or discharge port 180 is also provided for discharging compressed air from the ejector 166. A silencer 182 for silencing an exhaust sound produced by the compressed air when it is discharged from the ejector 166 is provided in the compressed-air discharge port 180. Check valves 183a and 183b are provided to prevent a pressurized fluid from being unnecessarily discharged into the vacuum port 176.

The interface block 152 will next be described below with reference to FIG. 7.

The interface block 152 is integrated into one system and connected to an external device such as a sequencer 158 or the like. The interface block 152 comprises a serial signal input/output unit 200 for inputting serial electric signals through a single terminal and outputting the same therefrom, a serial/parallel signal converter (S/P) 202 for converting the serial signals into corresponding parallel signals, a controller (CPU) 204 which serves as an arithmetic or operating means for generally controlling the interface block 152, and a sensor input/output unit 206 for inputting the parallel signals to a pressure sensor section 159. The interface block 152 also includes a first electromagnetic-valve input/output unit 208 for inputting parallel signals to the electromagnetic compressed air feed valve 162 and outputting the same therefrom, a second electromagnetic-valve input/output unit 210 for inputting parallel signals to the electromagnetic vacuum breakage valve 164 and outputting the same therefrom, a display unit 184 disposed on an upper surface of the interface block 152 for displaying pressure information or the like detected by a pressure sensor section 159 thereon, and an input/output unit 212 for inputting parallel signals to the display unit 184 and outputting the same therefrom. The respective components referred to above are electrically connected to one another by a bus line.

Figure 8:
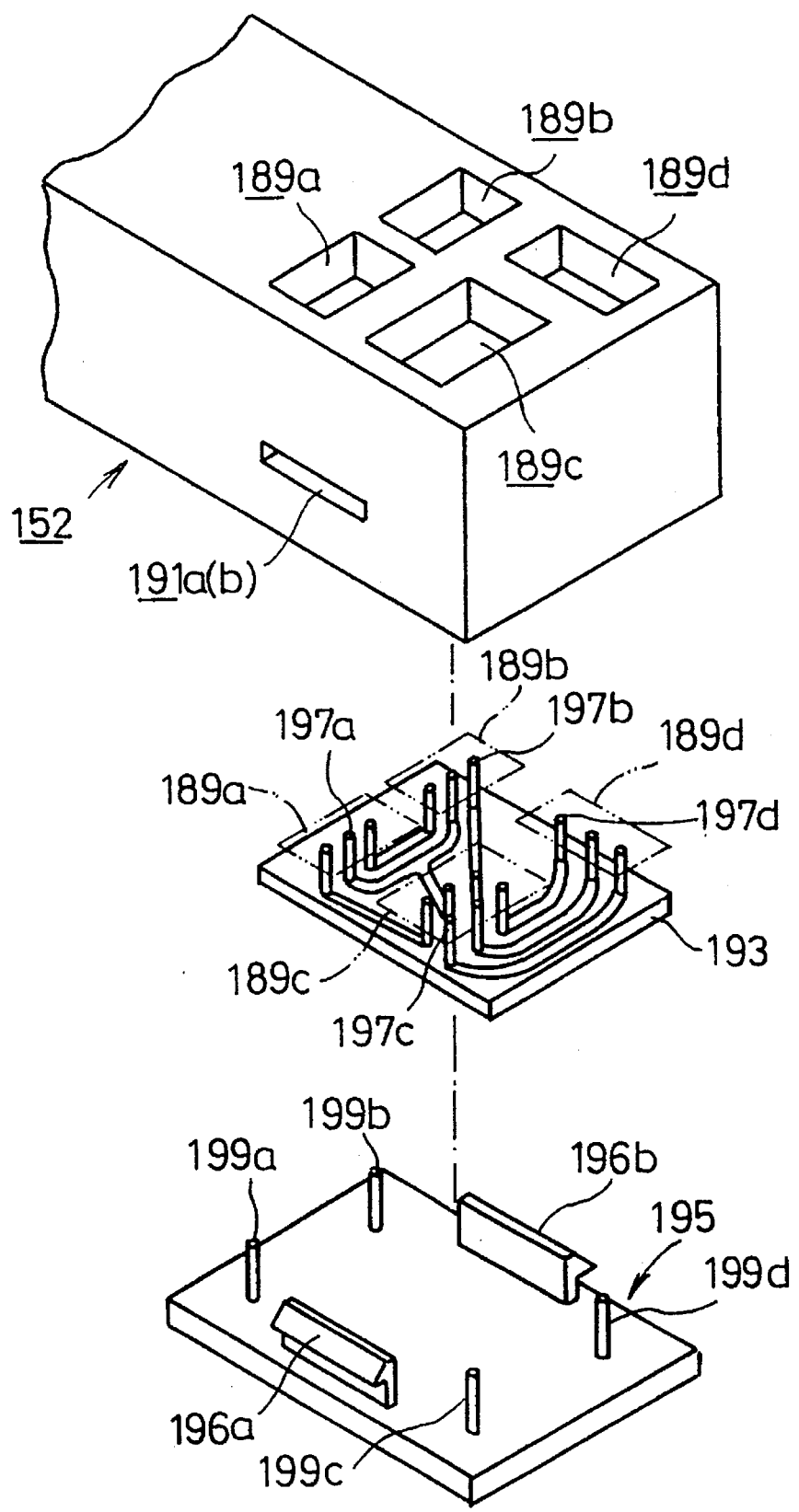
FIG. 8 is an exploded perspective view showing the structure of a terminal unit of the interface block shown in FIG. 7.

FIG. 8 shows an electrical connecting structure employed within the interface block 152. More specifically, a substrate 193 is accommodated in a space defined inside the structure. Pin-shaped members 197a through 197d shaped in the form of groups, and which project from the substrate 193, are exposed to the outside of the interface block 152 through holes 189a through 189d. An opening defined in a lower surface of the interface block 152 is closed by a cover 195. That is, the cover 195 has claws or stoppers 196a and 196b, which are in turn fitted into corresponding holes 191a and 191b defined in both sides of the interface block 152.

As understood from the drawing, the pin-shaped members 197a through 197d are implanted into a circuit pattern formed on the substrate 193. In the drawing, reference numerals 199a through 199d indicate guiding rods.

When it is desired to attach the substrate 193 to the interface block 152, the substrate 193 is first placed in a predetermined position and set on the cover 195 by the guiding rods 199a through 199d. The guiding rods 199a through 199d are then positioned by unillustrated guide holes and incorporated into the interface block 152.

Figure 7:
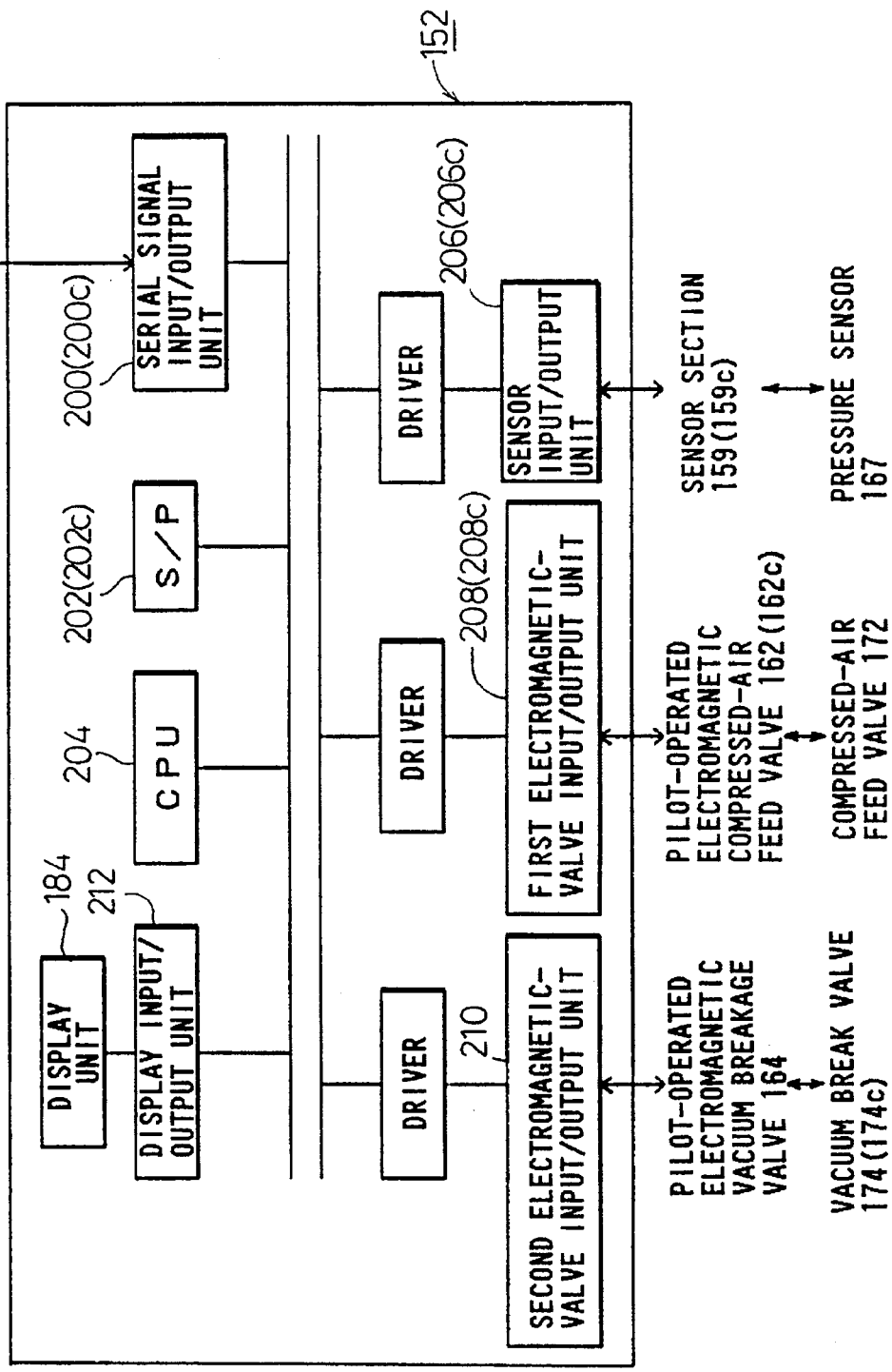
FIG. 7 is a circuit diagram illustrating an interface block employed in the fluid pressure device according to the present invention.

The electrical connections between the interface block 152 and the vacuum generating unit 154 are respectively made by connectors 186a through 186c made up of conductive elastic members or bodies (see FIGS. 6 and 7). More specifically, the electrical connections consist of an electrical connection between the pressure sensor section 159 and the sensor input/output unit 206, an electrical connection between the electromagnetic valve 162 and the first electromagnetic-valve input/output unit 208, and an electrical connection between the electromagnetic valve 164 and the second electromagnetic-valve input/output unit 210.

An attracting and feeding system 222, comprising a plurality of vacuum units 150 each of the type shown in FIG.

6 which are connected side by side to one another by a manifold 220, will next be shown as an illustrative example, and the operations of the attracting and feeding system 222 will be described below with reference to FIG. 9.

Figure 9:
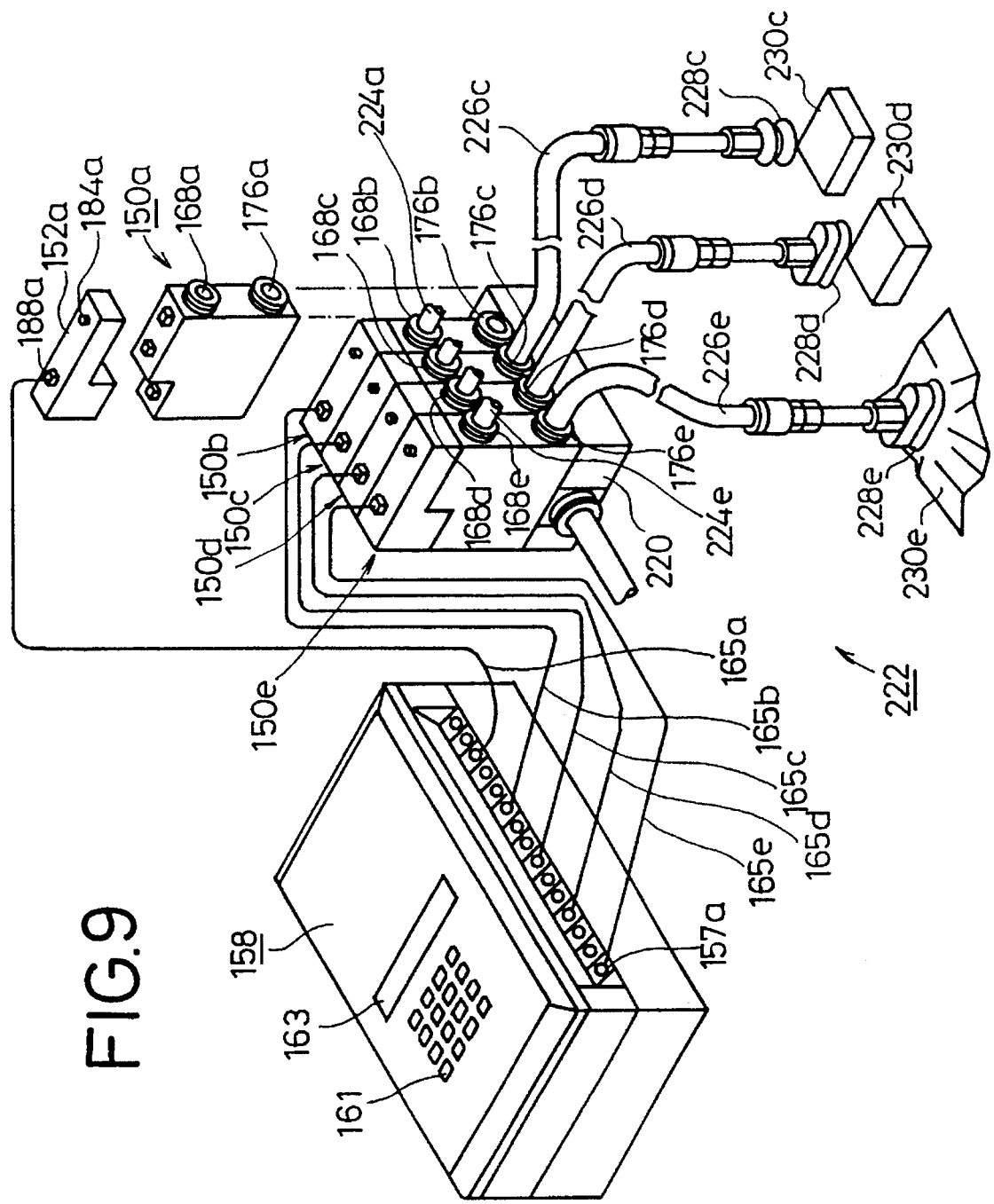
FIG. 9 is a perspective view depicting one example of a system in which the fluid pressure device according to the present invention is incorporated.

In the attracting and feeding system 222 shown in FIG. 9, a plurality of vacuum units 150a through 150e in which ejectors having different vacuum conditions are used as vacuum sources, are placed on the manifold 220. Compressed-air feed ports 168a through 168e attached to corresponding vacuum units 150a through 150e are coupled respectively to unillustrated compressed-air feed sources by tubes 224a through 224e. Further, vacuum ports 176c through 176e are connected to suction pads 228c through 228e by tubes 226c through 226e respectively.

Terminals 188 are disposed on upper surfaces of interface blocks 152, and signal terminals 157a used for the objects to be controlled are attached to a side surface of a sequencer 158. The terminals 188 and 157a are respectively connected to one another by individual signal wires 165a through 165e for allowing serial transmission therebetween. Input keys 161 and a display unit 163 comprised of an LCD are disposed on an upper surface of the sequencer 158.

Figure 10:
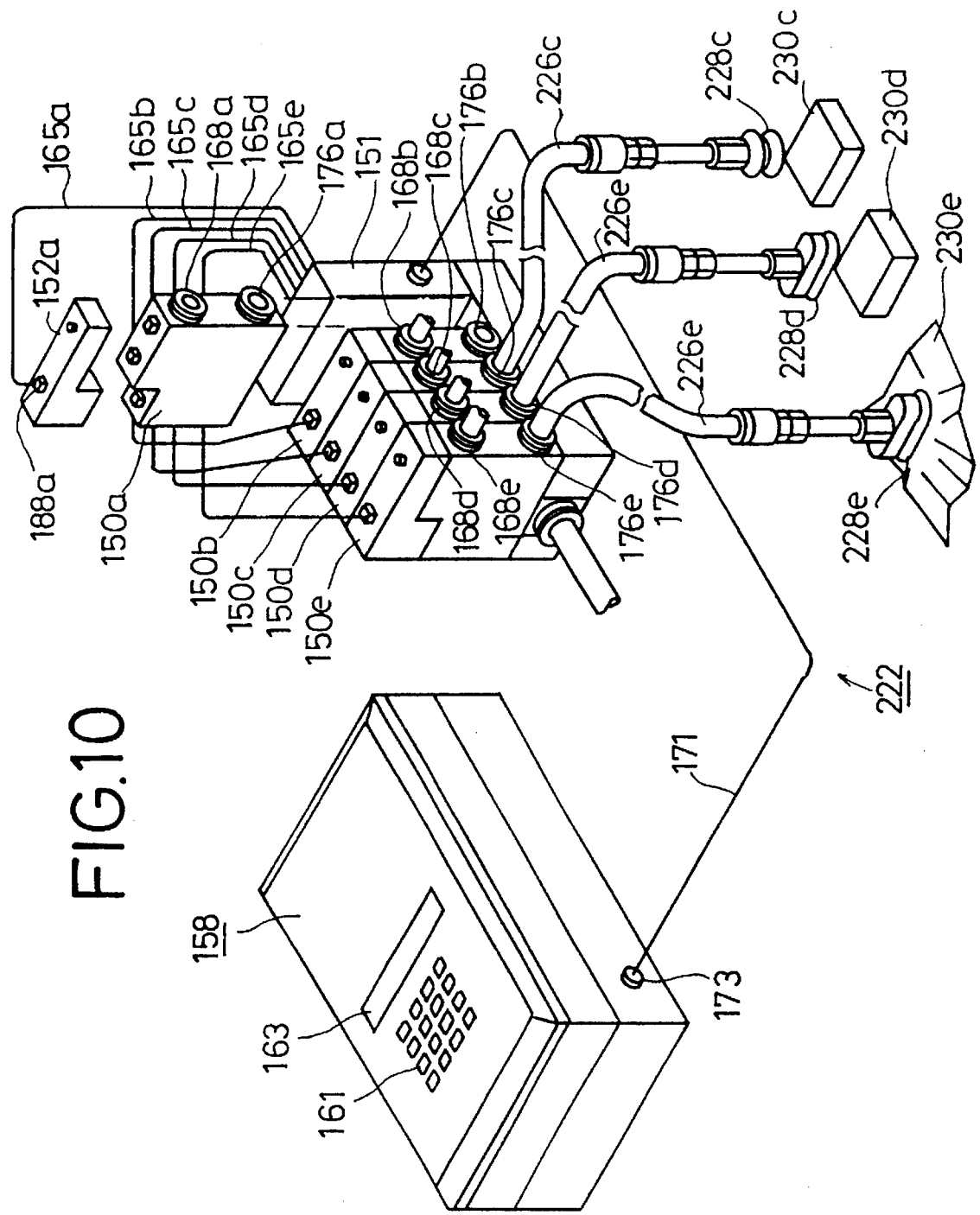
FIG. 10 is a perspective view illustrating another example of a system in which the fluid pressure device according to the present invention is incorporated.

FIG. 10 illustrates an attracting and feeding system 222 comprising a plurality of vacuum units 150a through 150e, in which ejectors respectively having different vacuum sucking conditions are used as vacuum sources, and a controller 151 for generally controlling the attracting and feeding system 222. The vacuum units 150a –150e and the controller 151 are placed on a manifold 220. Terminals 188a through 188e disposed on upper surfaces of interface blocks 152 are electrically connected to the controller 151 by individual signal wires 165a through 165e for providing serial transmission. Further, the controller 151 is electrically connected to the signal terminal 173 of a sequencer 158 by an individual signal wire 171 for providing serial transmission.

When the interface blocks 152a through 152e are not used as components, the controller 151 and the terminals of the vacuum units 150a through 150e may also be directly-connected to one another by a plurality of lead wires or bus lines, for example. At this time, signal transfer between the controller 151 and the vacuum units 150a through 150e is performed by parallel signals.

The respective vacuum units 150a through 150e are substantially identical in structure to each other in the following description, and accordingly operations of the vacuum units will be described below by reference only to the vacuum unit 50c, and descriptions of the other vacuum units will therefore be omitted. Further, the vacuum unit 150 shown in FIG. 6 and the vacuum unit 150c shown in FIG. 8 are substantially identical in structure to each other. Thus, small alphabetical letters are affixed to reference numerals indicating the components of the vacuum unit 150, and such components will not be described in detail.

When a work 230c is fed by the attracting and feeding system 222, serial signals outputted from the sequencer 158 are first inputted to a serial signal input/output unit 200c of the interface block 152c, and such signals are then converted into corresponding parallel signals by a serial/parallel signal converter (S/P) 202c. A corresponding parallel signal is inputted to a first electromagnetic-valve input/output unit 208c, which in turn sends an operation signal to an electromagnetic compressed air feed valve 162c, to thereby actuate the valve 162c and sequentially open a compressed-air feed valve 172c. As a result, compressed air is fed to an ejector 166c provided inside a body 156c of the vacuum generating unit to generate a vacuum or negative pressure, which is in turn supplied to a suction pad 228c through a vacuum port 176c. When the suction pad 228c supplied with the vacuum attracts the work 230c, the vacuum in a vacuum generating unit 154c is further raised. When the vacuum exceeds a pressure which has been preset in a pressure sensor section 159c, the pressure sensor section 159c sends a parallel signal to a sensor input/output unit 206c in the interface block 152c. Further, the parallel signal is converted into a serial signal by the serial/parallel signal converter (S/P) 202c. Thereafter, an attraction confirmation signal is sent to the sequencer 158 from the interface block 152c.

When the attraction confirmation signal is received by the sequencer 158, and after the elapse of a fixed time interval set by a timer, the sequencer 158 confirms the completion of movement of the work 230c. Thereafter, the sequencer 158 transmits a stop signal to the compressed-air feed valve 172c through a same or similar path as used for the supply of the operation signal, to thereby close the compressed-air feed valve 172c and stop the generation of the vacuum from the ejector 166c.

Simultaneously, a corresponding parallel signal, which results from the serial signals sent from the sequencer 158, is inputted to a second electromagnetic-valve input/output unit 210c, which in turn sends an operation signal to an electromagnetic vacuum break valve 164c, to thereby actuate the electromagnetic valve 164c and sequentially open a vacuum break valve 174c. Thus, compressed air is supplied to the suction pad 228c through the vacuum port 176c of the vacuum generating unit 154c, to thereby release the work 130c from the suction pad 228c.

Further, the sequencer 158 sends a stop signal to the electromagnetic valve 164c after a fixed time interval set by the timer provided inside the sequencer 158 has elapsed, thereby closing the electromagnetic valve 164c so as to complete the attracting and feeding operation.

Figure 11:
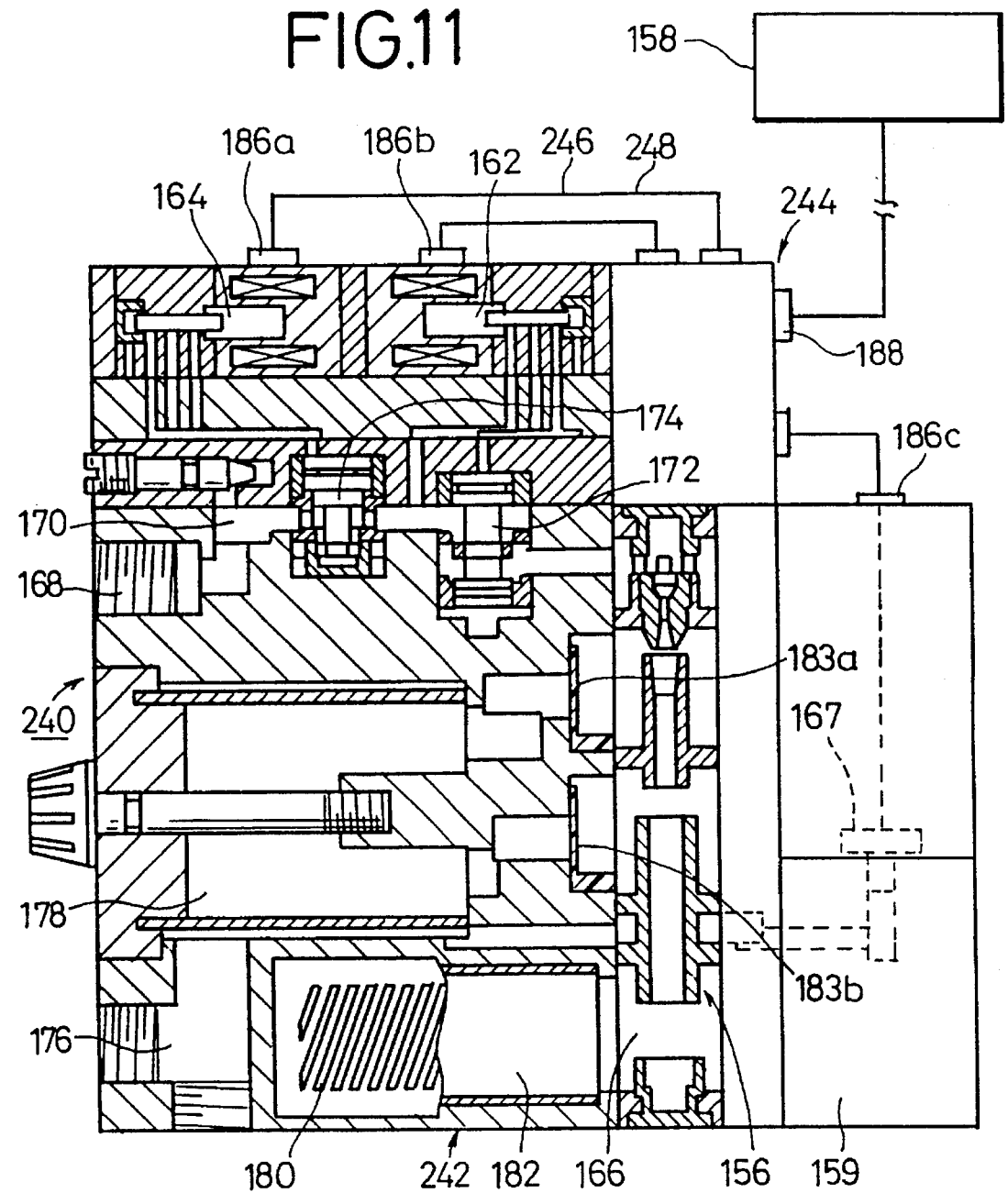
FIG. 11 is a partial cross-sectional view showing a fourth embodiment of a fluid pressure device according to the present invention.

FIG. 11 shows a fourth embodiment.

In FIG. 11, reference numeral 240 indicates a vacuum unit according to a fourth embodiment. The vacuum unit 240 basically comprises a vacuum generating unit 242 and an interface block 244.

The vacuum generating unit 242 is slightly different in structure from the vacuum generating unit 154 of the vacuum unit 150 according to the third embodiment. However, the interface block 244 has the same basic structure and functions as those of the interface block 152 employed in the third embodiment shown in FIG. 7.

The difference between the interface block 244 and the interface block 152 employed in the third embodiment is as follows. In the case of the interface block 152 employed in the third embodiment, the connection between the interface block 152 and the vacuum generating unit 154 is made by connectors alone. Further, other wires necessary for the connection are provided within the interface block 152. By contrast, in the case of the interface block 244, conductors 246 and 248 are externally wired. Thus, the interface block 244 makes it possible to more easily cope with troubles such as disconnections, etc.

In the fluid pressure device according to the present invention, a plurality of terminals are intensively disposed in a wall surface of the fluid pressure device for electrically connecting the fluid pressure device with an external device. The terminals and the external device are electrically connected to each other by a plug-in/one-touch system using a single multi-connector means. Further, when the external device and fluid passages thereof are interconnected, a fluid-passage connecting portion including a plug-in/one-touch system is also used. Thus, the rearrangement, or recombination, of each fluid unit based on desired functions and performance capabilities of the fluid pressure device, or the replacement of a fluid pressure device with another to cope with sudden troubles, can be rapidly and easily performed at a job site. In addition, a reduction in performance of the replaced fluid pressure device can be avoided.

According to the present invention as well, electrical wires which are electrically connected to an external device are united into a single system based on serial transmission, and are connected to the external device through a single terminal. Therefore, the configuration of signal wires can be greatly simplified, and the complexity of wiring work and the occurrence of miswiring can be avoided.

Further, a reduction in the number of signal wires makes it possible to avoid malfunctions caused by noise which can occur when a plurality of signal wires are used. Moreover, since the fluid pressure device is reduced in size and weight, various general-purpose properties of the device can be greatly enhanced.

We claim:

1. A fluid passage connecting device comprising:
   (a) a first fluid unit comprising a plurality of block shaped components connected together wherein each of said plurality of block shaped components of said first fluid unit performs a different function, said first fluid unit electrically connected to one external device and fluidically connected to another external device, said first fluid unit further comprising:
      (i) a first wall surface;
      (ii) a first plug-in electrical connecting means comprising a plurality of terminals mounted at one location on said first wall surface;
      (iii) a first plurality of fluid passages;
      (iv) a first plug-in fluid passage connecting means comprising a plurality of fluid ports disposed at another location on said first wall surface spaced from said one location;
   (b) a first electrical connection member having a plurality of connectors mating with said first plug-in electrical connecting means at said one location of said first wall surface;
   (c) a first unitary connecting block having a first plurality of fluid conduits mounted therein, said first plurality of fluid conduits inserted into said plurality of fluid ports of said first plug-in fluid passage connecting means at said another location of said first wall surface for connecting said first plurality of fluid conduits with said first plurality of fluid passages of said first fluid unit;
   (d) a second fluid unit comprising a plurality of block shaped components connected together, wherein each of said plurality of block shaped components of said second fluid unit performs a different function, said second fluid unit electrically connected to said one external device and fluidically connected to said another external device, said second fluid unit further comprising:
      (i) a second wall surface;
      (ii) a second plug-in electrical connecting means comprising a plurality of terminals mounted at one location on said second wall surface;
      (iii) a second plurality of fluid passages;
      (iv) a second plug-in fluid passage connecting means comprising a plurality of fluid ports disposed at another location on said second wall surface spaced from said one location of said second wall surface;
   (e) a second electrical connection member having a plurality of connectors mating with said second plug-in electrical connecting means at said one location of said second wall surface;
   (f) a second unitary connecting block having a second plurality of fluid conduits mounted therein, said second plurality of fluid conduits inserted into said second plug-in fluid passage connecting means at said another location of said second wall surface for connecting said second plurality of fluid conduits with said second plurality of fluid passages of said second fluid unit; and
   (g) a manifold; wherein:
   (h) said first and second fluid units are mounted on said manifold and said first and second fluid units are disposed adjacent to each other, and further wherein said first unitary connecting block can be disconnected from said first plug-in fluid passage connecting means while allowing said second unitary connecting block to remain connected to said second plug-in fluid passage connecting means.

2. A fluid pressure device as claimed in claim 19, further comprising first and second check valves for allowing fluid to flow in a first direction and preventing fluid from flowing in a second direction opposite to said first direction, said first and second check valves, respectively disposed in said first plurality of fluid passages and said second plurality of fluid passages in close proximity to at least one of said fluid ports of each of said first and second fluid units.

3. A fluid pressure device as claimed in claim 19, wherein said first and second plug-in electrical connecting means and said first and second plug-in fluid passage connecting means are respectively provided within adjacent regions substantially in a same plane on each of said first and second wall surfaces of said first and second fluid units; and wherein said first and second electrical connection members and said first and second pluralities of fluid conduits are each respectively mounted on said first and second unitary connecting blocks in a spaced relationship corresponding to said adjacent regions on each of said first and second wall surfaces.

4. A fluid pressure device as claimed in claim 3, further comprising first and second check valves for allowing fluid to flow in a first direction and preventing fluid from flowing in a second direction opposite to said first direction, said first and second check valves, respectively, disposed in said first plurality of fluid passages and said second plurality of fluid passages in close proximity to at least one of said fluid ports of each of said first and second fluid units.

5. A fluid pressure device as claimed in claim 1, further comprising a controller electrically connected to each of said first and second electrical connection members and said one external device, wherein said controller transmits a parallel signal to each of said first and second fluid units and transmits a serial signal to said one external device.

6. A fluid pressure device according to claim 1, wherein said plurality fluid ports of each of said first and second fluid units comprise a fluid feed port, an exhaust port and a vacuum port.

7. A fluid pressure device comprising:
   (a) a first fluid unit comprising a plurality of interconnected block components, wherein each of said plurality of block components of said first fluid unit performs a different function, said first fluid unit further comprising:
      (i) a first wall surface;
      (ii) a first electrical terminal disposed at a location on said first wall surface;
      (iii) a first plurality of fluid ports disposed on said first wall surface and spaced from said location on said first wall surface;

(b) a first electrical connector mating with said first electrical terminal;

(c) a first fluid connecting block having a plurality of fluid connectors mating with said first plurality of fluid ports;

(d) a second fluid unit comprising a plurality of interconnected block components, wherein each of said plurality of block components of said second fluid unit performs a different function, said second fluid unit further comprising:

(i) a second wall surface;
  (ii) a second electrical terminal disposed at a location on said second wall surface;
  (iii) a second plurality of fluid ports disposed on said second wall surface and spaced from said location on said second wall surface;

(e) a second electrical connector mating with said second electrical terminal;

(f) a second fluid connecting block having a plurality of fluid connectors mating with said second plurality of fluid ports; and (g) a manifold; wherein:

(h) said first and second fluid units are mounted on said manifold and said first and second fluid units are disposed adjacent to each other, and further wherein said first fluid connecting block can be disconnected from said first plurality of fluid ports while allowing said second fluid connecting block to remain connected to said second plurality of fluid ports.

8. The fluid pressure device of claim 7, wherein each of said first and second electrical connectors is respectively mounted upon said first and second fluid connecting blocks.

9. The fluid pressure device of claim 7, wherein each of said first and second wall surfaces is planar.

10. The fluid pressure device of claim 7, wherein said first plurality of fluid ports and said second plurality of fluid ports each includes a fluid feed port, an exhaust port and a vacuum port.

11. The fluid pressure device of claim 10, wherein said exhaust port is disposed between said fluid feed port and said vacuum port on each of said first and second fluid units.

12. The fluid pressure device of claim 10, wherein said first plurality of fluid ports and said second plurality of fluid ports are each aligned in a row.

13. The fluid pressure device of claim 7 wherein said first plurality of fluid ports and said first electrical terminal are aligned in a row on said first wall surface, and said second plurality of fluid ports and said second electrical terminal are aligned in a row on said second wall surface.

14. The fluid pressure of claim 13, wherein said first electrical connector is mounted upon said first fluid connecting block, and said second electrical connector is mounted upon said second fluid connecting block.

15. The fluid pressure device of claim 14, wherein said first plurality of fluid ports and said second plurality of fluid ports each includes a fluid feed port, a fluid exhaust port and a vacuum port.

* * * * *